United States Patent Office 3,562,322
Patented Feb. 9, 1971

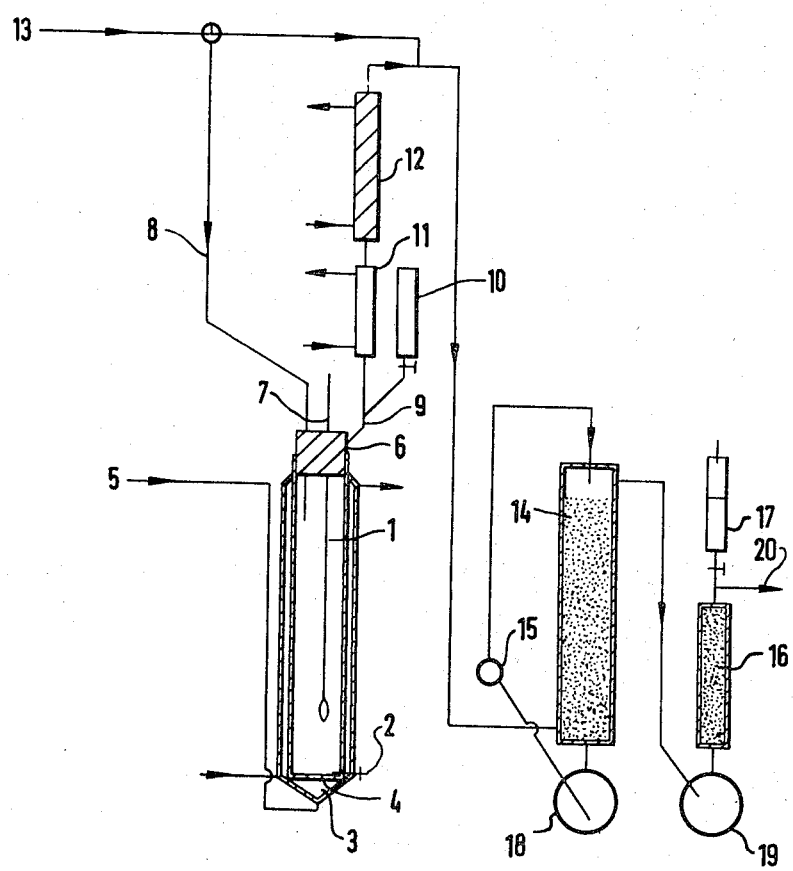

3,562,322
PREPARATION OF OXALIC ACID
Jacques Boichard, Bernard Pierre Brossard, Michel Louis Marie Joseph Gay, and Raymond Marc Clement Janin, Lyon, France, assignors to Rhone-Poulenc S.A., Paris, France, a French body corporate
Filed June 24, 1966, Ser. No. 560,151
Claims priority, application France, July 1, 1965, 23,136; Dec. 6, 1965, 41,078
Int. Cl. C07c 51/32
U.S. Cl. 260—533
7 Claims

ABSTRACT OF THE DISCLOSURE

Oxalic acid is prepared from ethylene by oxidation with nitric acid. The concentration of the nitric acid is maintained at least 16% throughout the reaction which is effected in the presence of a palladium or mercury catalyst.

---

The present invention relates to the preparation of oxalic acid by the oxidation of ethylene.

T. Akestorides, J. Prakt. Chem. (2), 15, 62 (1877), and H. Wieland and E. Sakellarios Ber. 53, 201 (1920) have already pointed out that the nitric acid oxidation of ethylene leads to the formation of oxalic acid, but found that the yields do not exceed 26% when the nitric acid concentration is 70%. With less concentrated nitric acid solutions, for example concentrations of from 23% to 30%, no oxidation of ethylene is observed. French Patent No. 1,363,089, teaches that, by the oxidation of ethylene with nitric acid having a concentration between 1% and 40%, preferably from 2% to 20%, in the presence of a palladium salt, glyoxal is formed. According to this patent, ethylene is passed into an aqueous nitric acid solution containing a palladium salt until the nitric acid concentration has fallen to below 1% by weight.

It has now been found, and this forms the subject of the present invention, that better yields of oxalic acid are obtained if the nitric acid oxidation of ethylene is carried out in the presence of a palladium or mercury catalyst, using the nitric acid concentrations specified below.

Accordingly the present invention provides a process for the preparation of oxalic acid which comprises oxidising ethylene with a solution of nitric acid containing a catalytic quantity, as hereinafter defined, of a palladium or mercury catalyst, the proportion by weight of nitric acid in said solution being at least 16% throughout the reaction.

The reaction temperature may vary within wide limits, depending upon the nitric acid concentration in the reaction medium. The operation is generally carried out at temperatures from 10° to 100° C. and preferably from 30° to 60° C. The ethylene employed need not be pure and may contain saturated hydrocarbons such as ethane.

The following palladium salts are suitable as the palladium catalyst: palladium chloride, nitrate, sulphate, oxalate and phosphate. Alternatively, palladium catalysts such as metallic palladium or hydrated palladium oxide which are capable of being converted into palladium nitrate under the reaction conditions may be used. The following mercury salts may be employed as the mercury catalyst: mercuric nitrate, acetate and sulphate. By a "catalytic amount" of the catalyst is meant a small amount such that the quantity of palladium or mercury in the reaction medium is more than 0.0001% by weight.

After the ethylene has been brought into contact with the aqueous nitric acid solution (of the appropriate concentration) containing the catalyst, the reaction mixture should be heated until no further gases (oxides of nitrogen) are evolved.

The concentration of the nitric acid in the reaction mixture while the ethylene is admitted thereto must not be too low. Although it is possible to operate with a nitric acid concentration of 16–17% by weight, it is preferable for the concentration to be above 20%, and this may be ensured by passing into the nitric acid solution having a concentration above 20% by weight, a quantity of ethylene such that at the end of the introduction the nitric acid concentration has not fallen below 20% by weight. It is also possible to add concentrated nitric acid, either periodically or continuously to maintain the nitric acid concentration in the reaction medium at a predetermined value, at the same time as ethylene is being passed into the mixture. If the operation is effected in a relatively dilute nitric acid medium, for example 16–20% by weight, it is advantageous to operate in the presence of a small quantity of nitrogen peroxide (up to 5% for example), because otherwise the reaction requires a very long initiation period in the course of which the metal catalyst is precipitated and then redissolved, this latter coinciding with the start of the reaction. The use of nitrogen peroxide makes it possible to avoid the precipitation of the catalyst and so shorten the initiation period of the reaction.

The concentration of the nitric acid must be kept within the desired limits while the reaction mixture is being heated, after the introduction of ethylene is complete, until evolution of gas ceases.

The process may be carried out by passing ethylene into the aqueous nitric acid solution in a sealed apparatus under pressure, but is preferably carried out by the following procedure.

The catalyst is introduced into a reactor partially charged with an aqueous nitric acid solution of appropriate concentration, optionally containing a small quantity of nitrogen peroxide, the contents of the reactor are brought to the temperature chosen for the reaction and a current of ethylene as fine bubbles is then gradually passed into the acid at a rate such that at least the greater part of the ethylene is absorbed. At the same time, nitric acid is added to maintain the nitric acid concentration within the desired limits. When the addition of ethylene is complete, heating of the reaction mixture is continued until no further gases are evolved. The time for this depends upon the temperature. The ethylene which has not been converted in the course of the oxidation may be recycled for a second oxidising operation. The catalyst is recovered in the mother liquors by known methods and may be reused for other operations. The oxalic acid formed is isolated by concentration of the mother liquors followed by precipitation. The reactants and the operating conditions employed in the process of the invention make the process particularly suitable for continuous operation.

The process may be conveniently carried out in the apparatus shown in the accompanying drawing. In this apparatus a cylindrical glass reactor 1, 420 mm. high and having a diameter of 60 mm. and an effective volume of 1200 cc., is equipped with a double jacket, an extraction tap 2 at its base, and a conical chamber 3 connected to the lower end of the reactor and sealed off, at the junction with the reactor, by a plate 4 of fritted glass No. 3 (porosity 15–40μ). A pipe 5 is provided for the supply of ethylene or nitrogen to chamber 3; it extends from the apex of the conical chamber, and rises beside the outer wall of the reactor and is adapted to be connected either to an ethylene cylinder or to a nitrogen cylinder. The reactor head consists of a ground-glass stopper 6 provided with a thermometer sheath 7, a pipe 8 for the admission of oxygen or inert gas, which opens above the level of the reaction mass, and a Y pipe 9 connected on the one hand to a dropping funnel 10 and on the other hand to a straight condenser 11, on which is mounted a coil-type condenser 12 (having a height of 150 mm.). Both condensers are supplied with ice-cold water (at a rate of 90 litres per hour). An oxygen source 13 may supply oxygen to the reaction pipe 8 direct to the bottom of column 14 (of height 400 mm., diameter 58 mm.) packed with Raschig rings, and mounted on a spherical receiver 18. The lower end of the column 14 is also connected to the upper part of condenser 12. The contents of receiver 18 may be circulated via pump 15 to the top of column 14. A second spherical receiver 19 mounted on the bottom of column 16 is also connected to the upper part of column 14 and a distilled-water reservoir 17 comprising a flow-adjusting valve in the collecting tube is mounted on column 16. A current of hot water is circulated through the double jacket of the reactor to keep it at the desired temperature. The effluent gases free from the nitrous vapours in columns 14 and 16 are conducted through pipe 20 to a device (not shown) comprising two potassium hydroxide absorbers (for the carbon dioxide formed in the course of the reaction), and an Orsat apparatus for determining the unconverted ethylene by absorption in "sulphovanadic" reagent.

It is thus possible to oxidise ethylene to oxalic acid without using highly concentrated nitric acid solutions. With an $HNO_3$ concentration of more than 20%, very satisfactory yields are obtained. While the yields are less good if the ethylene is oxidised in a medium having a rather low nitric acid concentration (for example 16–20%), the result is nevertheless better than that obtained by the earlier processes.

The following examples illustrate the invention. In these examples, the rates of gas supplied are expressed as rates relative to standard temperature and pressure (0° C., 760 mm. Hg).

EXAMPLE 1

The apparatus employed is illustrated in the accompanying drawing.

Before the operation was started, distilled water was introduced into the reservoir 17 and into the spherical receiver 18, the temperature of the water flowing through the double jacket of the reactor was adjusted to 40° C. and, while a gentle current of nitrogen was passed into the reactor in order to stop any liquid entering the chamber 3, 800 g. of 23% nitric acid (2.9 mol.) and 9.2 g. of an aqueous $PdCl_2$ solution containing 10% by weight of metallic palladium were introduced into the reactor through the dropping funnel 10.

When the temperature in the reactor reached 40° C., the current of nitrogen was stopped and a current of ethylene was passed in through 5 at a rate of 2.6 litres per hour. At the same time, oxygen was admitted to the pipe leading from the coil condenser 12 at a rate of 7.3 litres per hour in order to ensure complete oxidation of the nitrous vapors issuing from the reactor. After 2 hours, nitrous vapours (from the nitrogen peroxide formed in the reaction) oxidised by the oxygen were observed. 94.5% nitric acid was then gradually added to the reactor through the funnel 10. Thus, over 15½ hours a total of 51.2 g. of ethylene (1.83 mol.) and 170 g. (2.55 mol.) of nitric acid was introduced. Determination of the ethylene showed that 1.22 mol. had not been converted (extent of conversion 33%). The ethylene current was then stopped, a gentle current of nitrogen was passed through 5 into the reactor and the reaction mass in the reactor was maintained at 40° C. for a further 15 hours, the current of oxygen being maintained as in the preceding stage. When this second phase was complete, the reaction mass was cooled to 25° C. and a current of oxygen was then passed into the reactor, above the level of the liquid, for about 1 hour at a rate of 15 litres per hour in order to de-gas the apparatus and to ensure complete oxidation of the nitrous vapours still present.

The weight of the reaction mass at the end of the operation was 927 g. The oxalic acid was determined by manganimetry, after precipitation of its calcium salt, from a test specimen. The results of the reaction were as follows:

Oxalic acid yield (calculated on the unconverted ethylene)=53%;
Final concentration of nitric acid in the reactor=23.6%;
Traces of glyoxylic acid were found to be present.

EXAMPLE 2

Following the procedure of Example 1, 601 g. of 17.1% aqueous nitric acid solution and 6.9 g. of an aqueous palladium chloride solution containing 10% by weight of metallic palladium were introduced into the reactor. The reaction was carried out at 40° C., the $HNO_3$ concentration being maintained by the continuous addition of 63% nitric acid; the other operating conditions were as follows:

Rate of ethylene supply=1.31 litres per hour.
Rate of oxygen supply=5.7 litres per hour.
Duration of the passage of ethylene=14½ hours.
Quantity of ethylene introduced=23.7 g., (0.846 mol.)
Quantity of 63% nitric acid added during the whole experiment in order to maintain the nitric acid concentration between 17% and 18%=134.1 g. After the ethylene had been passed through for 15 minutes, the palladium precipitated. After 1½ hours, the precipitate had completely redissolved. When the passage of ethylene was complete, the reaction mass was maintained at 40° C. for a further 40 hours. Determination of the ethylene in the effluent gases showed that 0.643 mol of ethylene had been converted (76%). The oxalic acid was determined by manganimetry, after precipitation of its calcium salt, from a test specimen. The results of the reaction were as follows:

Weight of the reaction mass=724.2 g.;
Oxalic acid yield (calculated on the converted ethylene)=14.9%;
Final nitric acid concentration in the reactor=17.15%.
Some glyoxylic acid was found to be present.

EXAMPLE 3

Following the procedure of Example 1: 601 g. of 14.2% aqueous nitric acid containing 3.1% of $NO_2$ in solution, i.e. a total nitric acid concentration of 16.3%, and 6.9 g. of an aqueous palladium chloride solution containing 10% by weight of metallic palladium were introduced into the reactor. The reaction was carried out as indicated in the preceding example, using the same temperatures and pressures. The rates used were as follows:

Rate of ethylene supply=1.36 litres per hour.
Rate of oxygen supply=5.7 litres per hour.
Duration of the passage of the ethylene=15 hours 50 minutes.
Quantity of ethylene introduced=26.9 g. i.e. 0.961 mol.
Quantity of 63% $NHO_3$ added during the experiment=138.3 g.

It was noted that no precipitate formed during the reaction. When the passage of ethylene was complete, the reaction mass was maintained at 40° C. for a further 40 hours. Determination of the ethylene in the effluent gases showed that 0.448 mol. of ethylene had been converted (46.6%). The oxalic acid was determined by manganimetry, after precipitation of its calcium salt, from a test specimen. The results of the reaction were as follows:

Weight of the reaction mass=715.7 g.
Oxalic acid yield (calculated on the converted ethylene)=29.2%.
Final nitric acid concentration in the reactor=17.1%.
It was noted that some glyoxylic acid was also found to be present.

EXAMPLE 4

Following the procedure of Example 1: 22.9% aqueous nitric acid solution (800 g.) and $Hg(NO_3)_2$ (1.3 g.) were introduced into the reactor. The temperature of the reactants was brough to 40° C. and a current of ethylene was run into the reaction mass at a rate of 1.85 litres per hour. A current of oxygen was admitted to the pipe from the coil condenser at a rate of 7.3 litres per hour to ensure re-oxidation of the nitrous vapours issuing from the reactor. The temperature of the reaction medium was raised to 60° C. (the absorption of ethylene being negligible at this temperature), and maintained at this temperature for 6 hours, ethylene being circulated at the same rate. The flow of ethylene was then stopped and the reaction mass maintained at 60° C. for a further 20 hours. Since the nitric acid concentration in the reaction mass varied only slightly, it was not necessary to add nitric acid during the ethylene addition. The results of the reaction were as follows:

Quantity of ethylene introduced=1.25 mol.
Quantity of ethylene determined in the effluent gases=1.05 mol.
Weight of the reaction mass at the end of the reaction=783 g.
Final nitric acid concentration=17.85%.
Oxalic acid yield=45%. The presence of small quantities of glyoxylic acid was noted.

We claim:
1. Process for the preparation of oxalic acid which comprises oxidising ethylene at a temperature between 30° and 60° C. with a solution of nitric acid containing more than 0.0001% by weight of a palladium or mercury catalyst, the proportion by weight of nitric acid in said solution being at least 16% throughout the reaction.

2. Process according to claim 1, in which the proportion by weight of nitric acid is at least 20%.
3. Process according to claim 1, in which the catalyst is palladium chloride, nitrate, sulphate or phosphate.
4. Process according to claim 3, in which the catalyst is metallic palladium or hydrated palladium oxide.
5. Process according to claim 1, in which the catalyst is mercuric nitrate, acetate or sulphate.
6. Process according to claim 1, in which the reaction mixture also contains a small quantity of nitrogen peroxide.
7. Process according to claim 1, in which the reaction mixture is heated, after introduction of ethylene has ceased, until oxides of nitrogen are no longer evolved.

References Cited
UNITED STATES PATENTS
3,428,675   2/1969   Brossard et al. _____ 260—533

OTHER REFERENCES
Platz et al.: Chem. Abstr. 60: 14390c (1960).
Kearns et al.: Chem. Abstr. 17: 2106 (1923).
Kazarnovskiï: Chem. Abstr. 31: 661 (1937).

JAMES A. PATTEN, Primary Examiner
R. D. KELLY, Assistant Examiner